United States Patent [19]
Dalmasso et al.

[11] Patent Number: 5,460,845
[45] Date of Patent: Oct. 24, 1995

[54] METHOD OF DECONTAMINATION OF FOOD

[75] Inventors: Joseph Dalmasso; Thaddeus Mielnik, both of Apex, N.C.

[73] Assignee: American Sterilizer Company, Erie, Pa.

[21] Appl. No.: 247,471

[22] Filed: May 23, 1994

Related U.S. Application Data

[63] Continuation of Ser. No. 930,857, Aug. 14, 1992, abandoned.

[51] Int. Cl.⁶ ..................................................... A23B 9/30
[52] U.S. Cl. ........................ 426/320; 426/321; 426/331; 426/335; 426/532
[58] Field of Search .................................... 426/320, 321, 426/331, 335, 532, 539

[56] References Cited

U.S. PATENT DOCUMENTS

| | | | |
|---|---|---|---|
| 2,193,622 | 3/1940 | Coulter | 426/331 |
| 3,506,458 | 4/1970 | Martin. | |
| 3,728,134 | 4/1973 | Gilmore et al. . | |
| 3,792,177 | 2/1974 | Nakatani | 426/331 |
| 3,992,147 | 11/1976 | Christian et al. | 426/331 |
| 4,169,123 | 9/1979 | Moore et al. | 422/29 |
| 4,512,951 | 4/1985 | Koubek | 422/33 |
| 4,642,165 | 2/1987 | Bier | 203/88 |
| 4,826,698 | 5/1989 | Reznik | 426/320 |

FOREIGN PATENT DOCUMENTS 0243003  10/1987  European Pat. Off. .

OTHER PUBLICATIONS

Forney, et al., Vapor Phase Hydrogen Peroxide Inhibits Postharvest Decay of Table Grapes (Dec. 1991).

Rafei, et al., Abstract, Generation and Microbicidal Properties of Hydrogen Peroxide Vapor-Air Mixture (Spring, 1992).

*Primary Examiner*—Helen Pratt
*Attorney, Agent, or Firm*—Jones, Day, Reavis & Pogue

[57] ABSTRACT

A method and system of decontaminating the surface of food products including seeds, grains, nuts, spices, fruits and dried and dehydrated food with hydrogen peroxide vapor is provided.

9 Claims, 1 Drawing Sheet

METHOD OF DECONTAMINATION OF FOOD

This is a continuation of application Ser. No. 07/930,857 filed on Aug. 14, 1992, now abandoned.

FIELD OF INVENTION

The present invention relates to the fumigation and decontamination of the surface of food products, including seeds, nuts, grains, fruits, spices, dried and dehydrated food products.

BACKGROUND OF THE INVENTION

Decontamination of food products such as seeds, grains, nuts, spices, dried and dehydrated foods and fruits to rid them of yeast, molds, fungi, bacteria (and other microorganism), insect larvae and eggs, insects and mycotoxins produced by certain fungi, including species of Penicillium and Aspergillus, is an important concern for food growers, packagers, processors and consumers. How best to treat such foods products without damaging the appearance, texture, taste or other organoleptic properties of the food and without imposing environmental or health risks, e.g. depositing carcinogenic or mutagenic chemicals onto the foods or releasing such chemicals into the environment, because of such treatments has long been an area of investigation. Currently, propylene oxide is commonly used to decontaminate food products. Unfortunately, propylene oxide treatment poses undesirable environment and carcinogenic risks. Other decontamination treatments involve the use of ethanol, methyl bromide, chloropicrin, and hypochlorite.

For purposes of this invention, the word decontamination is used to indicate that the food products have been rid of the undesirable organisms to enhance the shelf life and processing attributes of the food, including meeting the Federal Food and Drug Administration guidelines and food processor specifications. The word is meant to include the concepts of disinfestation and fumigation as well.

Current decontamination techniques do not decontaminate foods of all bacteria, molds, yeast or decompose mycotoxins found on food products. For example, *Tilletia controversa*, the causal agent of dwarf bunt of wheat, a disease occurring primarily in winter wheat growing in regions having prolonged snow cover is particularly difficult to kill. In fact, because there is no known occurrence of *Tilletia controversa* in the Peoples Republic of China (PRC), the PRC requires that imported wheat be free of *T. controversa* teliospores. Accordingly, wheat from the United States is often not imported into the PRC. An economically feasible method to decontaminate wheat containing *T. controversa* is a solution to this problem.

The present invention overcomes the above described disadvantages of current decontaminate methods by decontaminating food products by exposing the food products to vapor phase hydrogen peroxide wherein the hydrogen peroxide vapor is generated from a multi-component solution and wherein the ratio of the hydrogen peroxide in the vapor is substantially the same weight percent composition as the liquid solution from which it was generated. In a first embodiment, the food product is exposed to one treatment of an effective amount of hydrogen peroxide vapor. This method has application at above, below and at ambient pressures. The liquid hydrogen peroxide concentration can be in any amount, preferably, but not limited to, from about 25–70%, while the concentration of vaporized hydrogen peroxide preferably ranges from 0.5–10 mg hydrogen peroxide/Liter volume of the exposure chamber or flow-through apparatus. The exposure chamber can be maintained at ambient, above and below ambient temperature. Achieving a hydrogen peroxide vapor concentration that is substantially the same weight percent composition as the liquid solution can be accomplished by any procedure which will flash vaporize the hydrogen peroxide solution. The appropriate concentration of hydrogen peroxide, exposure time, exposure pressure or vacuum, or flow-rates must be determined for each food product. These conditions must be determined empirically and will depend upon several factors, including:

1. surface area to volume ratio of the food product;
2. type of surface (i.e. skin, shell, casing)
3. presences of oil or fats;
4. level of cellulosic material present;
5. whether a batch, continuous or semi-continuous process is used; and
6. temperature at which one wishes to treat the product.

U.S. Pat. No. 4,642,165, provides an explanation of a method that achieves flash vaporization and that disclosure is incorporated herewith by reference. A product currently providing the appropriate flash vaporization is AMSCO's VHP Sterilizer. The equation for calculating hydrogen peroxide vapor concentration in an AMSCO VHP Sterilizer is as follows.

Concentration in mg/L =

$$\frac{\text{Inject rate (g/min.)} \times [H_2O_2] \times 1000 \text{ mg/g}}{\text{Air Flow rate (SCFM)} \times 28.32 \text{ L/cu ft.}}$$

The injection rate and hydrogen peroxide concentration are for liquid hydrogen peroxide. The term "SCFM" means standard cubic feet/minute.

In another embodiment of this invention, vapor-phase hydrogen peroxide is generated by an AMSCO VHP Sterilizer. This instrument was used to produce hydrogen peroxide vapor from 35% hydrogen peroxide solution that is drawn into the sterilizer which is an air tight chamber by vacuum. The sterilization cycle consists of three phases: dehumidification of the chamber atmosphere, generation of hydrogen peroxide vapor, and aeration. The hydrogen peroxide vapor, at a concentration of 3–4 mg/L within the chamber during fumigation, does not condense from the vapor state, and no free water is present to influence its action. It may be desirable to preheat the food product and/or the chamber to a sufficient temperature in order to avoid any condensation. Running at higher temperatures can also permit higher injections of hydrogen peroxide, thus potentially enhancing the kill rate. One or more treatment cycles are possible. For example, when two operating cycles are employed, one may be a deep vacuum (ca. 38 mm Hg, cycle 1) and the other a shallow vacuum (ca. 400–580 mm Hg, cycle 2) to inject the hydrogen peroxide vapor. Both cycles are aerated by deep vacuum evacuation of the chamber to remove residual hydrogen peroxide vapor followed by introduction of fresh air. The exhaust vapor is passed through a catalytic cell that oxidized the hydrogen peroxide to water and oxygen. The chamber temperature is normally 45–50 degrees C during a sterilizing cycle, although the temperature may be increased or decreased as determined necessary for effective treatment. In this process, the food product is exposed to the hydrogen peroxide for from about 3 to 30 minutes in each of the exposure steps to achieve a reduction in microbial levels. Exposure time may be increased or decreased to achieve the most efficient and effective treatment.

In an another embodiment of the present invention, rather than using an instrument where the food product is placed inside a chamber and removed in batch size quantities, it is contemplated that a conduit means will be used to pass the pre-sorted food product through a chamber being supplied by the hydrogen peroxide vapor generator. Such a conduit means can include, for example, a conveyor belt, an auger system or a shute system. The food product may then be aerated to remove the peroxide residuals by a variety of methods, for example, heating, subjecting the product to a vacuum, and supplying a volume of air or other gas over the product. The food is then conveyed to be finally packaged or proceed to further processing.

Although presently existing instruments have exposure chambers of from less than one cubic foot to 2000 cubic feet, it is contemplated that a chamber of any size can be built to accommodate any volume of food typically and normally encountered in the food industry. When using a conveyor system an air-tight chamber need not be used when exposing the food product to the vapor. It is contemplated that such a continuous process or semi-continuous process system may have multi unit processes, which could perform additional treatments to the food.

It is further envisioned that when working with dehydrated foods that are powders a fluidized bed reactor would be needed in order to ensure uniform opportunity for the gas to contact the surface of the individual food product particles.

SUMMARY OF INVENTION

It is therefore a main object of the present invention to provide a method of decontaminating seeds, grains, nuts, spices, dried and dehydrated food and fruits while avoiding environmental and toxicological problems. It is a further main object of the present invention to decompose any mycotoxins that may be present on the food product.

It is a another object of the invention to provide a method of decontaminating seeds, grains, nuts, spices, dried and dehydrated food and fruits in a continuous process so as to avoid the costs of decontamination of products by a batch method. Dried foods can include fruits such as raisins, prunes and the like. Dehydrated foods can include onion flakes, garlic powder, basil leaves, ginger root and the like.

Additional objects and advantages of the invention will be set forth in part in the description which follows, and in part will be obvious from the description, or may be learned by practice of the invention. The objects and advantages of the invention may be realized and obtained by means of instrumentalities and combinations particularly pointed out in the appended claims.

To achieve these objects and in accordance with the purpose of the invention, the present invention provides a method of decontaminating seeds, grains, nuts, spices, dried and dehydrated food and fruits using vapor phase hydrogen peroxide vapor that is of an effective concentration.

DETAILED DESCRIPTION OF THE DRAWINGS

Figure 1:
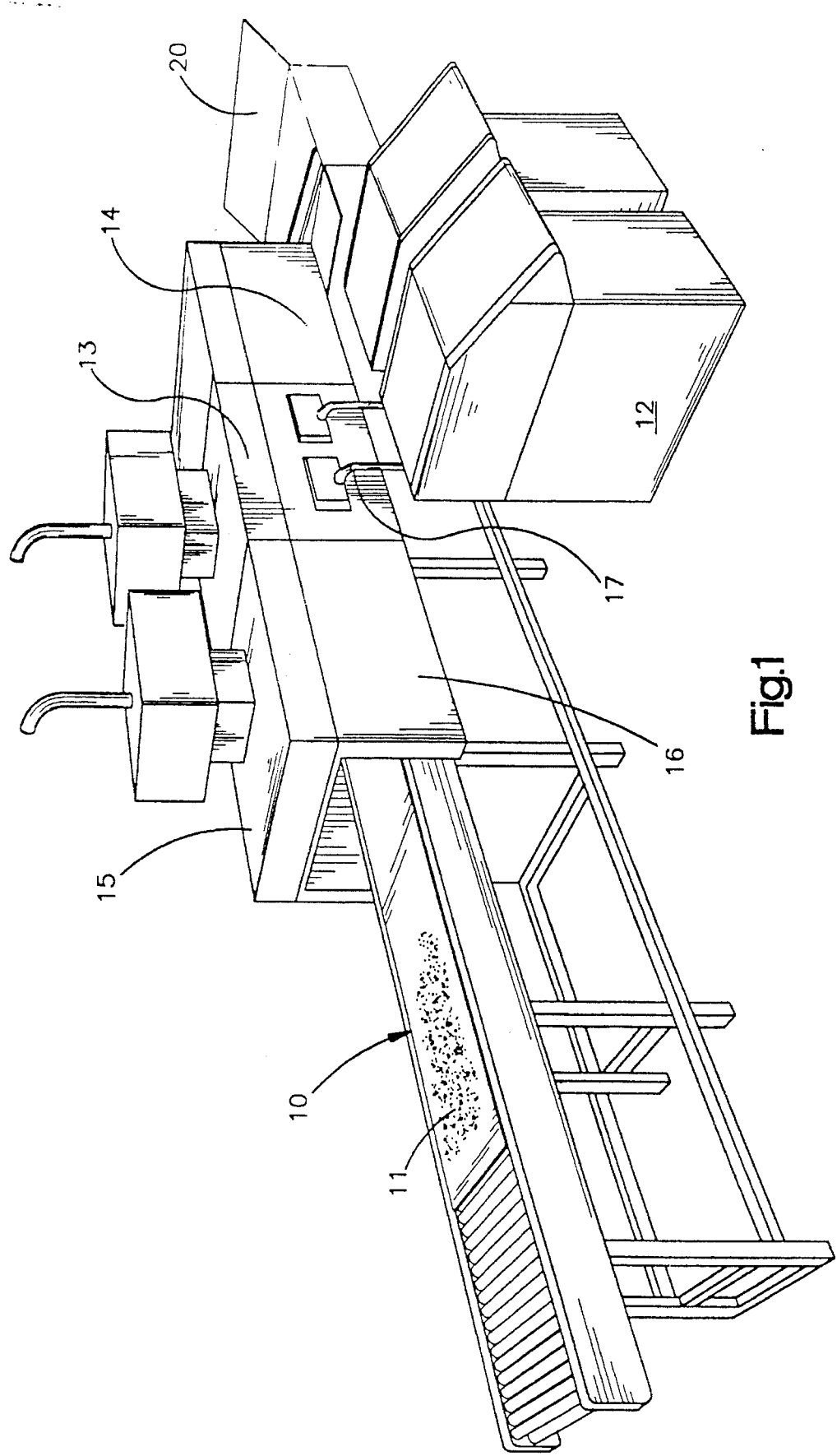
FIG. 1 is a schematic diagram of one embodiment of a continuous processing system.

Reference will now be made in detail to the embodiment shown in FIG. 1. The decontaminating system includes a conduit means (10) that transport the food product (11) into treatment chamber (15) whereupon the food product is preheated in a preheating portion (16) of chamber (15) and conveyed to a treatment portion (13) whereupon the food product is exposed to hydrogen peroxide vapor generated by the hydrogen peroxide vapor generator (12). The hydrogen peroxide vapor is introduced into the treatment portion (13) via an injector means (17). The food product is then conveyed to an aeration portion (14) of the chamber (15) where any hydrogen peroxide vapor residue is removed. The food is then conveyed for packaging (20).

DETAILED DESCRIPTION OF THE PREFERRED EMBODIMENT

It is contemplated that in the use of this invention the seeds, grains, nuts, spices, fruits, and dried and dehydrated food products are exposed to hydrogen peroxide in an temperature controlled environment for an effective period of time in an effective concentration of hydrogen peroxide to decontaminate the food product and to decompose any mycotoxins on the food products. While the specific time, temperature and hydrogen peroxide concentration may vary from food product to food product depending on the nature of the food product, its outer surface and the target organism or mycotoxin, it would not take undue experimentation to determine a particular application protocol for a given food substance. The following are but illustrative examples of the present invention as applied on various food substances.

EXAMPLES

There are very few food products that have specifications of zero level of microrganisms. In fact, root crops and products from root crops (e.g. onion skins, onion powders, arrowroot, ginger) often have very high microbial counts. A reduction of these counts to a lower level is the only practical treatment process for the food industry.

Representative contaminants observed are Aspergillus, Penicillium, Mucor, Botrytis, Fusarium, and Rhizopus species. While aerobic plate counts can reflect a wide variety of organisms, members of the genus Bacillus are frequently found on food products, and are especially prominent in root crops, e.g. onion. Root crops also often have moderate levels of coliform bacteria because of the associated soil.

The following are but a few examples where this invention has been effective in decontaminating by reducing aerobic plate counts, molds, yeasts and coliforms on food products.

Example 1

Nuts, Nutmeats

Large pieces of shelled walnuts (nutmeats) were treated in an atmosphere of vaporized hydrogen peroxide in concentrations of 2.1 and 4.2 mg/L at atmospheric pressure and room temperature (40° C.) for time periods of 7, 15, and 30 minutes. A two logarithmic reduction in microbial counts were observed. The results are provided below.

|  |  | Exposure | Microbial Counts After Exposure at Stated Concentrations | |
|---|---|---|---|---|
| Assay | Initial Levels | Time | 2.1 mg/L | 4.2 mg/L |
| Aerobic Plate Count | $2.3 \times 10^4$/gr | 7 min. | $1.9 \times 10^3$ | $8.5 \times 10^2$ |
|  |  | 15 min. | $1.4 \times 10^3$ | $5.5 \times 10^2$ |
|  |  | 30 min. | $1.0 \times 10^3$ | $8.5 \times 10^2$ |
| Yeast/Mold | $9.6 \times 10^3$/gr | 7 min. | $6.4 \times 10^2$ | $3.0 \times 10^2$ |
|  |  | 15 min. | $2.1 \times 10^2$ | $2.4 \times 10^2$ |
|  |  | 30 min. | $1.3 \times 10^2$ | $8.0 \times 10^1$ |
| Coliforms | $2.4 \times 10^2$/gr | 7 min. | $2.4 \times 10^1$ | 93 |
|  |  | 35 min. | 0.91 | 75 |
|  |  | 30 min. | $4.6 \times 10^1$ | 0.91 |

Example 2

Whole Almonds

Whole almonds were exposed to an atmosphere containing 2.0 mg/L of vaporized hydrogen peroxide for 4 minutes at atmospheric pressure and 40° C. The results below show that preheating the almond to the 40° C. improved the results. The results are provided below.

|  |  | Microbial Counts After Exposure at Stated Concentrations | |
|---|---|---|---|
| Assay | Initial Levels | 2.1 mg/L | 4.2 mg/L |
| Aerobic plate count | $6.0 \times 10^2$/gr | Preheated | $3.0 \times 10^1$ |
|  |  | Non-Preheated | $1.1 \times 10^2$ |
| Molds | $1.6 \times 10^3$/gr | Preheated | 8.1 |
|  |  | Non-heated | 3.0 |

Example 3

Spices, Peppers and Onions

The food products listed below were exposed nominally to 1.9 mg/L of vaporized hydrogen peroxide. These were time course studies to evaluate continued exposure at a moderate concentration of hydrogen peroxide. Exposure times generally ran to 60 or 90 minutes. Provided below are the beginning level of organisms and the organism count at the end of the longest run.

| FOOD PRODUCT | INITIAL LEVEL | END LEVEL |
|---|---|---|
| Whole Onions, roots and stems intact | | |
| Aerobic Plate Count* | $2.5 \times 10^5$ | 60 min. $2.7 \times 10^5$ |
| Mesophilic spores | $1.3 \times 10^4$ | 60 min. $1.2 \times 10^2$ |
| Total coliforms | $1.1 \times 10^2$ | 60 min. 3.9 |
| Black peppercorns | | |
| Aerobic plate count | $1.5 \times 10^7$ | 96 min. $2.0 \times 10^5$ |
| Mesophilic spores | $1.0 \times 10^6$ | 96 min. $2.4 \times 10^5$ |
| Dutch caraway | | |
| Aerobic plate count | $3.2 \times 10^3$ | 92 min. $8.0 \times 10^1$ |
| Mesophilic spores | $5.2 \times 10^2$ | 92 min. $3.0 \times 10^1$ |
| Egyptian Basil (ground green leaves) | | |
| Aerobic plate count | $4.0 \times 10^6$ | 85 min. $1.0 \times 10^6$ |
| Yeast | $1.6 \times 10^5$ | 85 min. $5.2 \times 10^4$ |
| Mold | $2.4 \times 10^5$ | 85 min. $2.6 \times 10^2$ |
| Mesophilic spores | $1.8 \times 10^6$ | 85 min. $3.4 \times 10^5$ |
| Fresh Basil (whole leaf) | | |
| Yeast | $1.0 \times 10^6$ | 60 min $2.1 \times 10^3$ |
| Total coliforms | 30 | 60 min. Less than 0.6 |
| Mesophilic spores | $4.8 \times 10^3$ | 60 min. $1.8 \times 10^2$ |
| Whole Allspice | | |
| Aerobic plate count | $5.7 \times 10^6$ | 60 min. $4.8 \times 10^5$ |
| Mold | $2.4 \times 10^2$ | 60 min. Less than 10 |
| Mesophilic spores | $3.9 \times 10^6$ | 60 min. $9.3 \times 10^5$ |
| Large dehydrated Chopped Onion | | |
| Aerobic plate count | $1.5 \times 10^5$ | 60 min. $8.8 \times 10^2$ |
| Mold | $2.4 \times 10^3$ | 60 min. $2.0 \times 10^2$ |
| Total coliform | $2.2 \times 10^2$ | 60 min. Less than 0.6 |
| Mesophilic spores | $1.9 \times 20^5$ | 60 min. $1.6 \times 10^3$ |
| Culled, Dry Onion Skins and Roots | | |
| Aerobic plate count | $2.9 \times 10^5$ | 70 min. $2.9 \times 10^3$ |
| Mold | $1.6 \times 10^2$ | 70 min. Less than 10 |
| Total coliform | 1.8 | 70 min. Less than 0.3 |
| Mesophilic spores | $3.7 \times 10^5$ | 70 min. $7.0 \times 10^3$ |
| Dried Indonesian Ginger Root | | |
| Aerobic plate count | $2.7 \times 10^6$ | 60 min. $9.5 \times 10^4$ |
| Garlic Cloves (unpeeled) | | |
| Aerobic plate count | $5.6 \times 10^5$ | 60 min. Less than 10 |
| Mold | $5.0 \times 10^3$ | 60 min. Less than 10 |
| Dried Garlic Skins (with visible mold) | | |
| Aerobic plate count | $5.0 \times 10^6$ | 60 min. $3.2 \times 10^5$ |
| Mold | $1.2 \times 10^5$ | 60 min. $2.0 \times 10^3$ |
| Mesophilic spores | $1.4 \times 10^5$ | 60 min. $4.8 \times 10^4$ |

*While aerobic plate count did not decrease at this concentration, it is contemplated that an effective concentration could be determined. Such experiments were not performed.

Example 4

Wheat Seed

The decontamination cycle for wheat seeds consisted of three phases: dehumidification of the chamber, generation of the hydrogen peroxide from 35% liquid concentration achieving a vapor concentration of 3–4 mg/L within the chamber during exposure, and aeration. Two operating cycles were employed, one using a deep vacuum (ca. 38 mmHg, cycle 1) and the other a shallow vacuum (ca. 580 mmHg, cycle 2) to introduce the hydrogen peroxide vapor. The chamber temperature was held to 46°–50° C. Seeds were contaminated with surface-borne teliospores of *T. tritici* and *T. controversa*. These bacteria did not germinate after 5-minutes of exposure to the hydrogen peroxide vapor. The treatment did not wet the wheat seed nor influence its germinability, even if applied for more than 30 minutes.

The results using an AMSCO VHP Sterilizer are provided below. The numbers represent the percent germination of teliospores of the surface of the seed.

| Treatment | Time (Min.) | H₂O₂* | Germination T. tritici | T. controversa |
|---|---|---|---|---|
| None | 0 | 0 | 81.0 | 69.5 |
| Deep Vacuum | 3:15 | 1.1 | 0.1 | 0.0 |
| Deep Vacuum | 8:15 | 2.3 | 0.0 | 0.0 |
| Deep Vacuum | 16:30 | 5.2 | 0.0 | 0.0 |
| Deep Vacuum | 21:00 | 6.6 | 0.0 | 0.0 |
| Deep Vacuum | 30:00 | 9.8 | 0.0 | 0.0 |
| Shallow Vacuum | 1:00 | 0.3 | 0.0 | 0.0 |
| Shallow Vacuum | 5:00 | 2.1 | 0.0 | 0.0 |
| Shallow Vacuum | 10:00 | 4.6 | 0.0 | 0.0 |
| Shallow Vacuum | 21:00 | 7.9 | 0.0 | 0.0 |
| Shallow Vacuum | 29:00 | 11.0 | 0.0 | 0.0 |

*Numbers represent volume of 35% Hydrogen peroxide solution (ml) consumed by decontamination cycle.

Example 5

Barley Seed

The following are the test results obtained from using an AMSCO VHP Sterilizer to test the effectiveness against the germination of teliospores of *T. japonicus*, *T. brizaeformis* and *T. tectorum*.

| Treatment | Time (Min). | H₂O₂* | % Germination All Organisms |
|---|---|---|---|
| None | 0 | 0 | 36.5 |
| Shallow Vacuum (580 mmHg) | 1:09 | 0.2 | 28.2 |
| Shallow Vacuum | 3:00 | 1.1 | 1.0 |
| Shallow Vacuum | 17:00 | 7.0 | 0.0 |

*Numbers represent volume of 35% hydrogen peroxide solution (ml) consumed by sterilizer during operation.

Example 6

Wheat Seed

The following are the test results obtained from using the AMSCO VHP Sterilizer to evaluate the effectiveness against *T. indica*.

| Treatment | Time (Min). | H₂O₂* | % Germination T. indica |
|---|---|---|---|
| None | 0 | 0 | 9.6 |
| Deep Vacuum (38 mmHg) | 1:00 | 0:3 | 2.0 |
| Deep Vacuum | 3:00 | 1.0 | 1.2 |
| Deep Vacuum | 15:00 | 4.6 | 0.0 |

*Numbers represent volume of 35% hydrogen peroxide solution (ml) consumed by sterilizer during operation.

Example 7

Fresh Fruit

The sensitivity of the four spores most economically important to post harvest decay fungi, *Botrytis cinerea*, *Penicillium digitatum*, *P. italicum* and *Monilinia fructicola* were evaluated for their sensitivity to exposure to hydrogen peroxide vapor in accordance with this invention. It was found that dilute concentrations of 35% hydrogen peroxide were also effective when used in the AMSCO VHP Sterilizer. All spores, except those from *Monilinia fructicola*, did not germinate when exposed to vaporized hydrogen peroxide generated with liquid hydrogen peroxide diluted form 35% to 0.025% and 0.05% and exposed for 5 minutes, cycle 2. The *Monilinia fructicola* still germinated using hydrogen peroxide diluted to 0.2%. However, it is expected with a higher concentration the spores would be inactivated, but further work was not done.

In specific studies with lemons, artificial surface wounds were created and inoculated with *Penicillium digitatum* and the injured fruit exposed to vaporized hydrogen peroxide generated from 3.1% liquid hydrogen peroxide [5 minutes exposure, cycle 2.] 87% of the untreated, inoculated fruit decayed. However, the decay rate of fruit inoculated and treated hydrogen peroxide vapor treated fruit was decreased as the interval between the inoculation and treatment steps was extended from 2 to 24 hours. Specific data, respectively, for intervals and percent decay are 2, 4, 6, 8, 12, and 24 hours [intervals], and 77, 87, 80, 83, 70, 35, and 23 percent decay. Vaporized hydrogen peroxide treatment appears to have an adverse effect on spores present on artificially damaged fruit.

Accordingly, there has been disclosed a method of decontaminating food products by exposing the surface of the food product to hydrogen peroxide vapor that is generating from a multi-component liquid solution such that the concentration of the hydrogen peroxide in the vapor is substantially equal to the weight percent composition as the solution from which the vapor is generated.

While this invention has been described in connection with preferred embodiments, it is not intended to limit the scope of the invention to particular embodiments set forth, but, to the contrary, it is intended to cover such alternatives, modifications, and equivalents as may be included within the spirit and scope of the invention as defined by the appended claims.

What is claimed is:

1. A method of decontaminating a food product in a treatment chamber, comprising the steps of:

(a) dehumidifying the treatment chamber;

(b) exposing the food product in the treatment chamber to a vapor consisting essentially of hydrogen peroxide vapor and water vapor under a first vacuum, wherein the exposure is maintained for an amount of time effective to decontaminate the food product; and (c) removing substantially all hydrogen peroxide vapor residue from the food product after the exposure to the vapor;

wherein the food product is selected from the group consisting of dried foods, dehydrated foods, and mixtures thereof.

2. The method according to claim 1, wherein the food product is selected from the group consisting of seeds, spices, nuts, grains, and mixtures thereof.

3. The method according to claim 1, wherein the first vacuum is about 38 mmHg.

4. The method according to claim 1, wherein the first vacuum is about 400–580 mmHg.

5. The method according to claim 1, which further comprises the step of exposing the food product to the vapor using a second vacuum, wherein the second vacuum is different than the first vacuum.

6. The method according to claim 5, wherein the second vacuum is lower than the first vacuum.

7. The method according to claim 6, wherein the first vacuum is about 38 mmHg and the second vacuum is about 400–580 mmHg.

8. The method according to claim 1, which further comprises the step of heating the treatment chamber to between about 45–50 degrees C. during the step of exposing the food product.

9. The method according to claim 1, wherein the food product is exposed to the vapor for a time period of from about 3 to 30 minutes.

* * * * *